United States Patent
Wee et al.

(10) Patent No.: US 9,128,967 B2
(45) Date of Patent: Sep. 8, 2015

(54) STORING GRAPH DATA IN A COLUMN-ORIENTED DATA STORE

(75) Inventors: Sewook Wee, San Jose, CA (US); John Mills Akred, San Jose, CA (US)

(73) Assignee: Accenture Global Services Limited, Dublin (IE)

(*) Notice: Subject to any disclaimer, the term of this patent is extended or adjusted under 35 U.S.C. 154(b) by 966 days.

(21) Appl. No.: 13/279,566

(22) Filed: Oct. 24, 2011

(65) Prior Publication Data

US 2013/0103725 A1    Apr. 25, 2013

(51) Int. Cl.
G06F 7/00 (2006.01)
G06F 17/30 (2006.01)

(52) U.S. Cl.
CPC .................. *G06F 17/30315* (2013.01)

(58) Field of Classification Search
CPC ............... G06F 17/30315; G06F 17/30958
USPC .......................................................... 707/812
See application file for complete search history.

(56) References Cited

U.S. PATENT DOCUMENTS

| 2004/0204905 | A1* | 10/2004 | Huelsbergen et al. | 702/179 |
| 2006/0074857 | A1* | 4/2006 | Etzold et al. | 707/3 |
| 2007/0083347 | A1* | 4/2007 | Bollobas et al. | 703/2 |
| 2010/0293203 | A1* | 11/2010 | Williams | 707/805 |
| 2011/0078104 | A1* | 3/2011 | Honkola et al. | 706/47 |
| 2011/0307685 | A1* | 12/2011 | Song | 712/16 |
| 2012/0109935 | A1* | 5/2012 | Meijer | 707/713 |
| 2012/0271860 | A1* | 10/2012 | Graham et al. | 707/798 |

OTHER PUBLICATIONS

Mike Stonebraker et al., "C-Store: A Column-oriented DBMS", Proceedings of the 31st VLDB Conference Trondheim, Norway, 2005, 12 pages.
Article entitled "NoSQL", found at Wikipedia website URL: http://en.wikipedia.org/w/index.php?oldid=453000605, last visited Jan. 26, 2012, 6 pages.
Christof Strauch, "NoSQL Databases", found at website URL: http://www.christof-strauch.de/nosqldbs.pdf, last visited Jan. 26, 2012, 149 pages.
Wikipedia, "Universally unique identifier", Dec. 11, 2014, 12 pages.
The Apache Software Foundation, "Welcome to Apache Cassandra", 2009, 3 pages.
Github, Inc., "Property Graph Model", Jun. 13, 2012, 2 pages.

* cited by examiner

*Primary Examiner* — James Trujillo
*Assistant Examiner* — Jessica N Le
(74) *Attorney, Agent, or Firm* — Harrity & Harrity, LLP

(57) ABSTRACT

Methods and apparatuses are provided for storing graph data within a column-oriented data store. Graph data including vertex data describing one or more vertices in the graph and edge data describing one or more edges within the graph may be received. One or more vertex rows within the column-oriented data store may be assigned, whereby each vertex row of the one or more vertex rows is assigned to one vertex of the one or more vertices. One or more edge rows within the column-oriented data store may also be assigned, whereby each edge row of the one or more edge rows is assigned to one edge of the one or more edges. At least one vertex row and at least one edge row may be populated based on the graph data.

36 Claims, 6 Drawing Sheets

STORING GRAPH DATA IN A COLUMN-ORIENTED DATA STORE

FIELD

The instant disclosure relates generally to NoSQL data stores and, more specifically, to storing graph data in a column-oriented data store.

BACKGROUND

In computing, "NoSQL" is a term used to define a broad class of database management systems that differ from traditional database management systems (e.g., relational database management systems) in a variety of ways. For example, the data stores used within NoSQL database management systems may not require fixed table schemas, may avoid join operations, and oftentimes scale horizontally. NoSQL database management systems address many of the shortcomings associated with traditional relational databases, such as, for example, poor performance on data-intensive applications (e.g., large-scale document indexing, serving pages on high-traffic websites, delivering streaming media, etc.).

One existing class of NoSQL data stores is a graph database. As known in the art, a graph database uses graph structures with vertices, edges, and properties to represent and store information. For example, mathematically, a graph may be defined as a combination of vertices (also referred to as "nodes") and edges connecting the vertices, i.e., (Graph=<Vertice(s), Edge(s)>). Graphs serve as useful tools for representing a wide variety of real-world relationships. For example, in a graph of a social network, each person might be represented by a vertex while a friendship between two people might be represented as an edge.

FIG. 6 herein illustrates one example of a graph 600. As shown in FIG. 6, there are three vertices (each represented by a circle) and three edges (each represented by a line) connecting the vertices. Each vertex has a different vertex ID. For example, the vertex in the upper left-hand region of FIG. 6 has a vertex ID of 1 (i.e., vertex 1), the vertex in the upper right-hand region has a vertex ID of 2 (i.e., vertex 2), and the vertex in the lower region has a vertex ID of 3 (i.e., vertex 3). Each vertex may also include any number of additional properties. For example, vertex 3 is shown having the additional properties of a name (Josh) and an age (32). Thus, in this example, vertex 3 could represent a thirty-two year-old named Josh. Furthermore, each vertex may have a label. For example, vertex 2 is shown having the label "ACCOUNT," while vertex 3 is shown having the label "PERSON."

Similarly, each edge may have a different edge ID. For example, the edge connecting vertex 1 to vertex 3 is edge 8, the edge connecting vertex 3 to vertex 2 is edge 11, and the edge connecting vertex 2 to vertex 1 is edge 9. As with vertices, edges may also have any number of additional properties. For example, edge 9 includes the label "paid." This could indicate, for example, that the entity (e.g., a person or organization) represented by vertex 2 paid money to the entity associated with vertex 1. Furthermore, edges can have directions or be undirected. For example, edge 11 is an undirected edge connecting vertex 3 to vertex 2. However, edge 8 is directed from vertex 1 to vertex 3. Thus, edge 8 may be referred to as an outgoing edge of vertex 1 and/or an incoming edge of vertex 3. Likewise, edge 9 may be referred to as an outgoing edge of vertex 2 and/or an incoming edge of vertex 1. Edges can also be characterized as having a source and a target. For example, vertex 1 is the source vertex for edge 8 and vertex 3 is the target vertex for edge 8. Thus, as demonstrated by the exemplary graph 600 of FIG. 6, graphs can be described by their graph data, which includes (1) vertex data describing the different vertices and the properties of those vertices and (2) edge data describing the different edges and the properties of those edges.

While graph databases are useful for storing graph data, they are limited in their ability to store and facilitate the retrieval of other types of data. Furthermore, accessing and manipulating graph data stored in a graph database can inhibit computing performance.

Another existing class of NoSQL data stores is the column-oriented data store. One existing implementation of a column-oriented data store is Apache™ Cassandra. Within Cassandra, data is logically represented as a large table (or spreadsheet). A table (i.e., a "keyspace" in Cassandra's nomenclature) may contain a plurality of rows (i.e., "keys" in Cassandra's nomenclature). Each row may also include one or more columns. Cassandra supports a flexible schema, meaning that each row may have a different number of columns. Furthermore, Cassandra incorporates the concept of a "column family." Each column family categorizes columns for efficient data storage and access purposes. Accordingly, a piece of data can be accessed using an address consisting of a row name, a column family name, and a column name, i.e., (data address=<row name, column family name, column name>).

While graph databases are sufficient for storing graph data, they suffer from a number of drawbacks related to scalability and computing performance. Accordingly, it is desirable to provide techniques for storing graph data in a column-oriented data store in order to improve scalability and computing performance.

SUMMARY

The instant disclosure describes techniques and apparatuses for storing graph data in a column-oriented data store including a plurality of rows and columns. To this end, in one example, graph data representing a graph may be received by a column-oriented data store population engine including a row assignment engine. The row assignment engine is configured to assign one or more vertex rows within the column-oriented data store, wherein each vertex row of the one or more vertex rows may be assigned to one vertex of the one or more vertices. The row assignment engine is also configured to assign one or more edge rows within the column-oriented data store, wherein each edge row of the one or more edge rows may be assigned to one edge of the one or more edges. The column-oriented data store population engine is then configured to populate at least one vertex row and at least one edge row based on the graph data.

In one example, the column-oriented data store population engine also includes a column assignment engine. The column assignment engine is configured to assign at least three different vertex column families within each vertex row, each vertex column family comprising at least one vertex column, wherein each at least one vertex column comprises at least one sub-row, and wherein each at least one sub-row is configured to store at least one of vertex ID data and edge ID data. In this manner, the column-oriented data store population engine may be further configured to populate the at least one sub-row with at least one of the vertex ID data and the edge ID data. As used herein, vertex ID data includes data uniquely identifying each vertex in the graph and edge ID data includes data uniquely identifying each edge in the graph. In one example, the at least three different vertex column families include Incoming Edges, Outgoing Edges, and Undirected Edges.

With regard to the vertex ID data and the edge ID data, in one example, the column-oriented data store population engine also includes an identification (ID) assignment engine configured to: (1) assign a different ID to each vertex of the one or more vertices to provide the vertex ID data and (2) assign a different ID to each edge of the one or more edges to provide the edge ID data.

In another example, the column assignment engine is configured to assign a Properties vertex column family within each vertex row, the Properties vertex column family comprising at least one properties column, wherein each at least one properties column comprises at least one sub-row, and wherein each at least one sub-row is configured to store at least row type data. As used herein, type data includes data identifying a particular row of the column-oriented data store as being either a vertex row or an edge row. In this example, the column-oriented data store population engine is further configured to populate the at least one sub-row of the at least one properties column with the row type data.

In one example, there are at least two sub-rows within each of the at least three different vertex column families. In this example, the first sub-row of the at least two sub-rows is configured to store the vertex ID data and the second sub-row of the at least two sub-rows is configured to store the edge ID data. In this manner, the column-oriented data store population engine may be further configured to populate the first sub-row with the vertex ID data and the second sub-row with the edge ID data. Note that the designation of sub-rows as "first" or "second" as used herein is done to aid in understanding. However, the ordering implied by these labels is not a requirement of any of the illustrated examples and in fact, the stated ordering can be changed without the loss of generality.

In one example where the column-oriented data store population engine includes a column assignment engine, the column assignment engine may be configured to assign at least a Vertices edge column family within each edge row, the Vertices edge column family comprising at least one edge column, wherein each at least one edge column comprises at least one sub-row, and wherein each at least one sub-row is configured to store at least one of vertex ID source data and vertex ID target data. As used herein, vertex ID source data includes data describing a source vertex from which an edge emanates and vertex ID target data includes data describing a target vertex where an edge terminates. In this manner, the column-oriented data store population engine may be further configured to populate the at least one sub-row with at least one of the vertex ID source data and the vertex ID target data.

With regard to the vertex ID source data and the vertex ID target data, in an example where the column-oriented data store population engine includes the ID assignment engine, the ID assignment engine may be configured to: (1) assign a different ID to each source vertex of the one or more vertices to provide the vertex ID source data and (2) assign a different ID to each target vertex of the one or more vertices to provide the vertex ID target data.

In another example, the column assignment engine is configured to assign a Properties edge column family within each edge row, the Properties edge column family comprising at least one properties column, wherein each at least one properties column comprises at least one sub-row, and wherein each at least one sub-row is configured to store at least row type data, such as the row type data discussed above. In this example, the column-oriented data store population engine may be further configured to populate the at least one sub-row of the at least one properties column with the row type data.

Related methods, apparatuses, and computer-readable media for carrying out the aforementioned techniques are also disclosed.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 1:
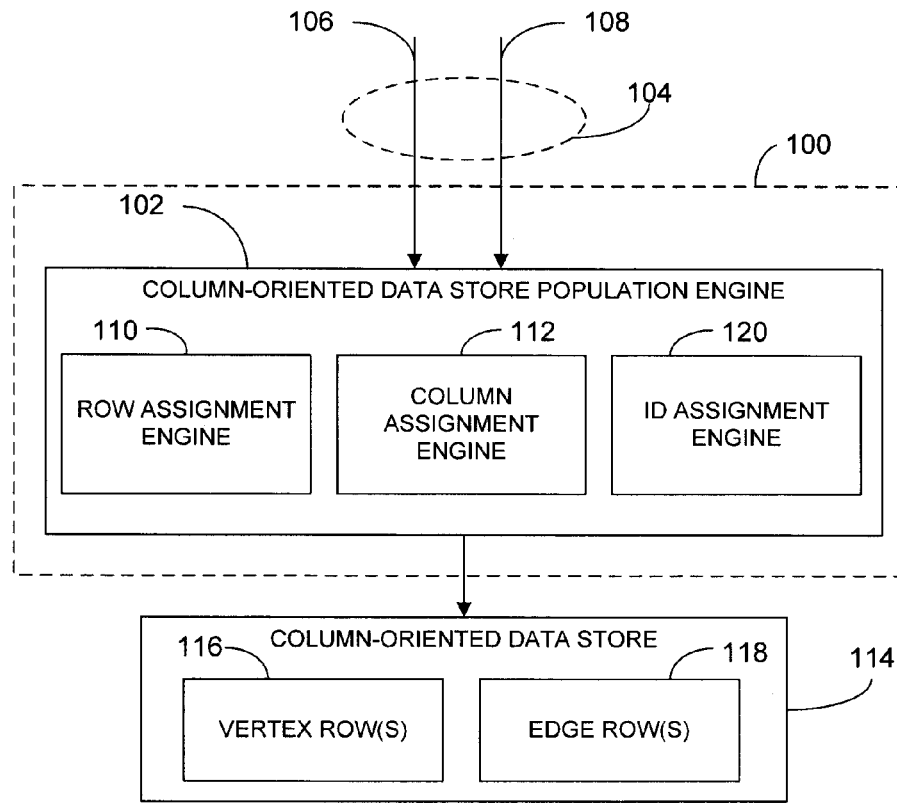
FIG. 1 is a block diagram illustrating one example of an apparatus for storing graph data in a column-oriented data store.

Referring now to FIG. 1, one example of an apparatus 100 for storing graph data in a column-oriented data store 114 that includes a plurality of rows and columns is illustrated. In the illustrated example, apparatus 100 includes a column-oriented data store population engine 102. The column-oriented data store population engine 102 includes a row assignment engine 110, a column assignment engine 112, and an identification (ID) assignment engine 120. The column-oriented data store population engine 102 is configured to receive graph data 104 describing a graph. The graph data 104 includes vertex data 106 and edge data 108. The vertex data 106 describes the different vertices of the graph and the properties of those vertices and the edge data 108 describes the different edges of the graph and the properties of those edges.

The row assignment engine 110 is configured to assign one or more vertex rows 116 within the column-oriented data store 114. In order to assist with the discussion of FIG. 1, the exemplary vertex row 300 of FIG. 3 will be referenced intermittently. Continuing with FIG. 1, each vertex row of the one or more vertex rows 116 is associated with one vertex of the one or more vertices in the graph. The row assignment engine 110 is also configured to assign one or more edge rows 118 within the column-oriented data store 114. In order to assist with the discussion of FIG. 1, the exemplary edge row 400 of FIG. 4 will also be referenced intermittently. In any event, each edge row of the one or more edge rows 118 is associated with one edge of the one or more edges in the graph.

Following the assignment of the rows by the row assignment engine 110, the column-oriented data store population engine 102 is configured to (1) populate at least one vertex row of the one or more vertex rows 116 in the column-oriented data store 114 with data and (2) populate at least one edge row of the one or more edge rows 118 in the column-oriented data store 114 with data. As such, the population of the vertex row(s) 116 and edge row(s) 118 by the column-oriented data store population engine 102 is based on the graph data 104.

Figure 3:
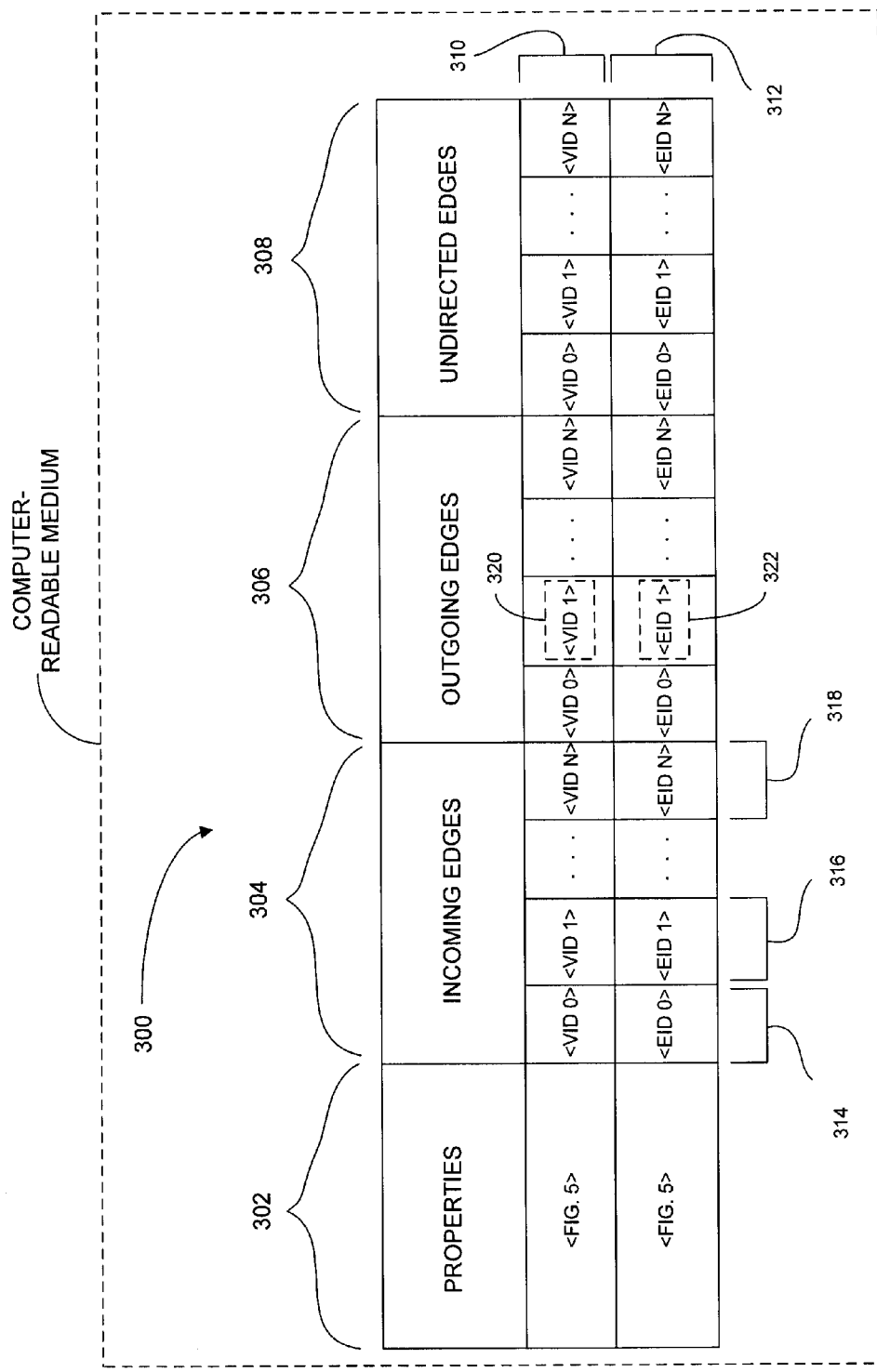
FIG. 3 is a diagram illustrating one example of a vertex row populated with data in accordance with the instant disclosure.
Figure 6:
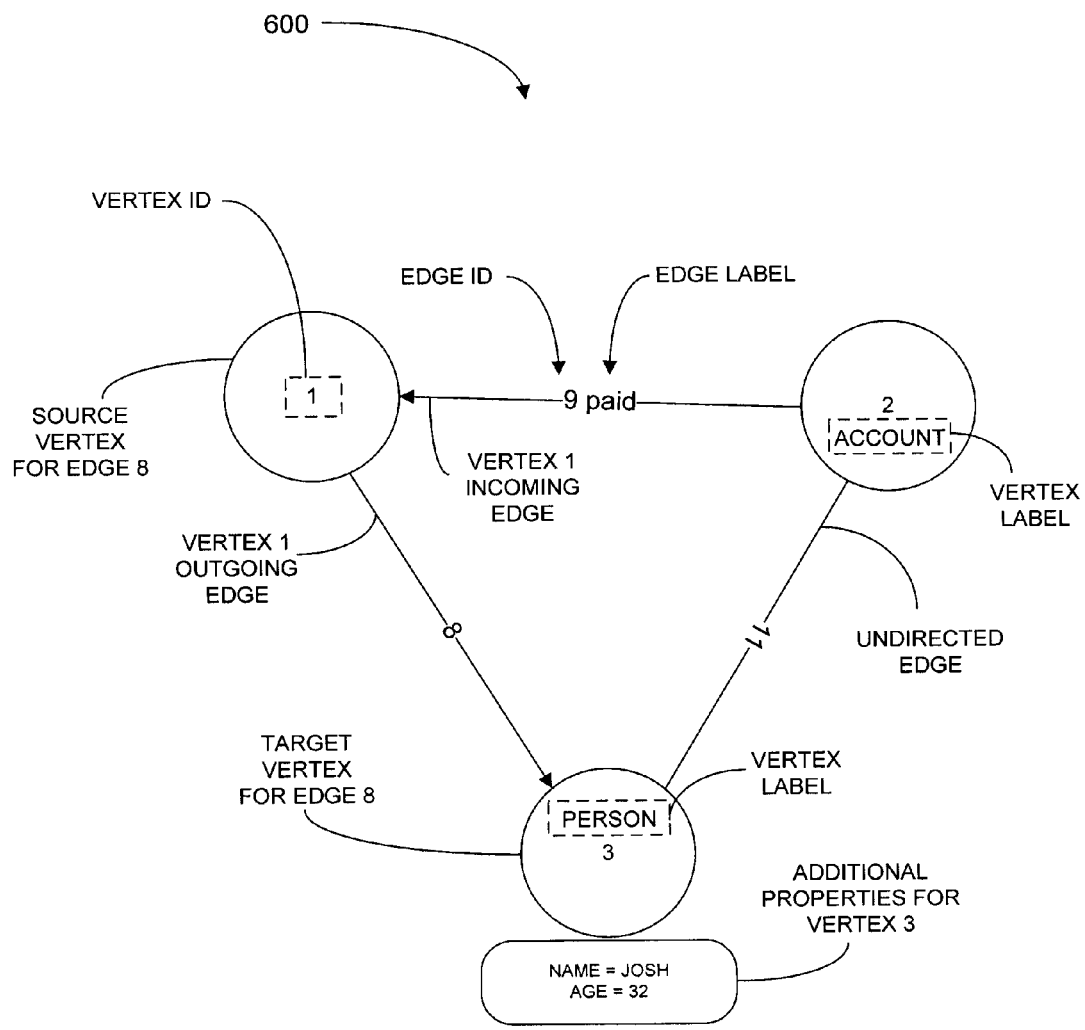
FIG. 6 is a diagram illustrating an exemplary graph that includes graph data that can be stored in a column-oriented data store in accordance with the instant disclosure.

The column assignment engine 112 is configured to assign at least three different vertex column families within each vertex row. As shown in FIG. 3, exemplary vertex column families include Properties 302, Incoming Edges 304, Outgoing Edges 306, and Undirected Edges 308. Each vertex column family includes at least one vertex column, such as vertex columns 314, 316, and 318 shown in FIG. 3. However, it is recognized that in some instances, there may not be any vertex columns in a given vertex column family. For example, and with reference back to FIG. 6, vertex 1 is shown having an incoming edge (edge 9) and an outgoing edge (edge 8). Accordingly, consistent with the instant disclosure, in one example, a vertex row corresponding to vertex 1 of FIG. 6 may include the vertex column family Undirected Edges. However, in this example, there might not be any vertex columns within the vertex column family Undirected Edges, because there are no undirected edges connected to vertex 1.

Furthermore, each vertex column (e.g., vertex column 314) includes at least one sub-row, such as sub-row 310. Each sub row (e.g., sub-row 310 and/or sub-row 312) within the vertex column families Incoming Edges 304, Outgoing Edges 306, and Undirected Edges 308 is configured to store at least one of vertex ID data and edge ID data. For example, and with continued reference to FIG. 3, the Outgoing Edges vertex column family 306 is depicted as having a vertex column that stores vertex ID data 320 in sub-row 310 and edge ID data 322 in sub-row 312. Separating edges within a vertex row based on their direction is useful because many graph traversals follow a direction, and therefore this architecture may permit quick access to a set of edges sharing a common direction (e.g., outgoing). Nonetheless, following the assignment of the vertex column families within each vertex row, referring back to FIG. 1, the column-oriented data store population engine 102 is configured to populate the sub-rows (e.g., sub-rows 310, 312) with the vertex ID data (e.g., vertex ID data 320) and the edge ID data (e.g., edge ID data 322). As used herein, vertex ID data includes data uniquely identifying each vertex in the graph and edge ID data includes data uniquely identifying each edge in the graph.

In an embodiment, the component responsible for assigning the vertex ID data and the edge ID data is the ID assignment engine 120. While only a single ID assignment engine 120 is discussed herein, those having ordinary skill in the art will appreciate that there can be as many or as few ID assignment engines 120 as desired. Continuing, the ID assignment engine 120 is configured to: (1) assign a different ID to each vertex in the graph to provide the vertex ID data and (2) assign a different ID to each edge in the graph to provide the edge ID data. In one example, the ID assignment engine 120 uses the universally unique identifier (UUID) scheme to assign a vertex ID to each vertex and an edge ID to each edge in accordance with well-known techniques. As known in the art, the UUID scheme includes several different versions for generating unique identifying data. In one example, the ID assignment engine 120 uses version 4 (random number version) of the UUID scheme. Of course, other suitable unique identifying schemes known in the art may be equally employed within the context of the present disclosure.

In the exemplary vertex row 300 shown in FIG. 3, there are two sub-rows 310, 312 within the vertex column families Incoming Edges 304, Outgoing Edges 306, and Undirected Edges 308. In this example, the first sub-row 310 is configured to store the vertex ID data and the second sub-row 312 is configured to store the edge ID data. In this manner, the relationship between vertices and edges can be maintained within the vertex row 300. For example, and with reference to the vertex column storing vertex ID data 320 and edge ID data 322 (i.e., the vertex column contained within the vertex column family Outgoing Edges 306), the vertex ID data 320 can act as a column name for the vertex column, and the edge ID data 322 can act as a value for that vertex column. Thus, in the preceding example, edge ID data 322 can identify an outgoing edge of the vertex associated with vertex ID data 320. Likewise, the other vertex ID data/edge ID data pairs within the vertex columns of the vertex column families Incoming Edges 304, Outgoing Edges 306, and Undirected Edges 308 can identify all of the incoming, outgoing, and undirected edges connected to each vertex within the graph. In this manner, the column-oriented data store population engine 102 is configured to populate the first sub-row (e.g., sub-row 310) within the vertex column families Incoming Edges 304, Outgoing Edges 306, and Undirected Edges 308 with vertex ID data. Additionally, the column-oriented data store population engine 102 is configured to populate the second sub-row (e.g., sub-row 312) within the vertex column families Incoming Edges 304, Outgoing Edges 306, and Undirected Edges 308 with edge ID data.

While the preceding example used the vertex ID data as the column name within the vertex column families and the edge ID data as the column value within the vertex column families, it is understood that in some embodiments, edge ID data is used both for the column name and the column value. For example, in an embodiment where the graph data 104 to be stored in the column-oriented data store 114 represents a multigraph (i.e., a graph wherein there are multiple edges between a single pair of vertices), it may be desirable to use edge ID data for both the column name and the column value.

Figure 5:
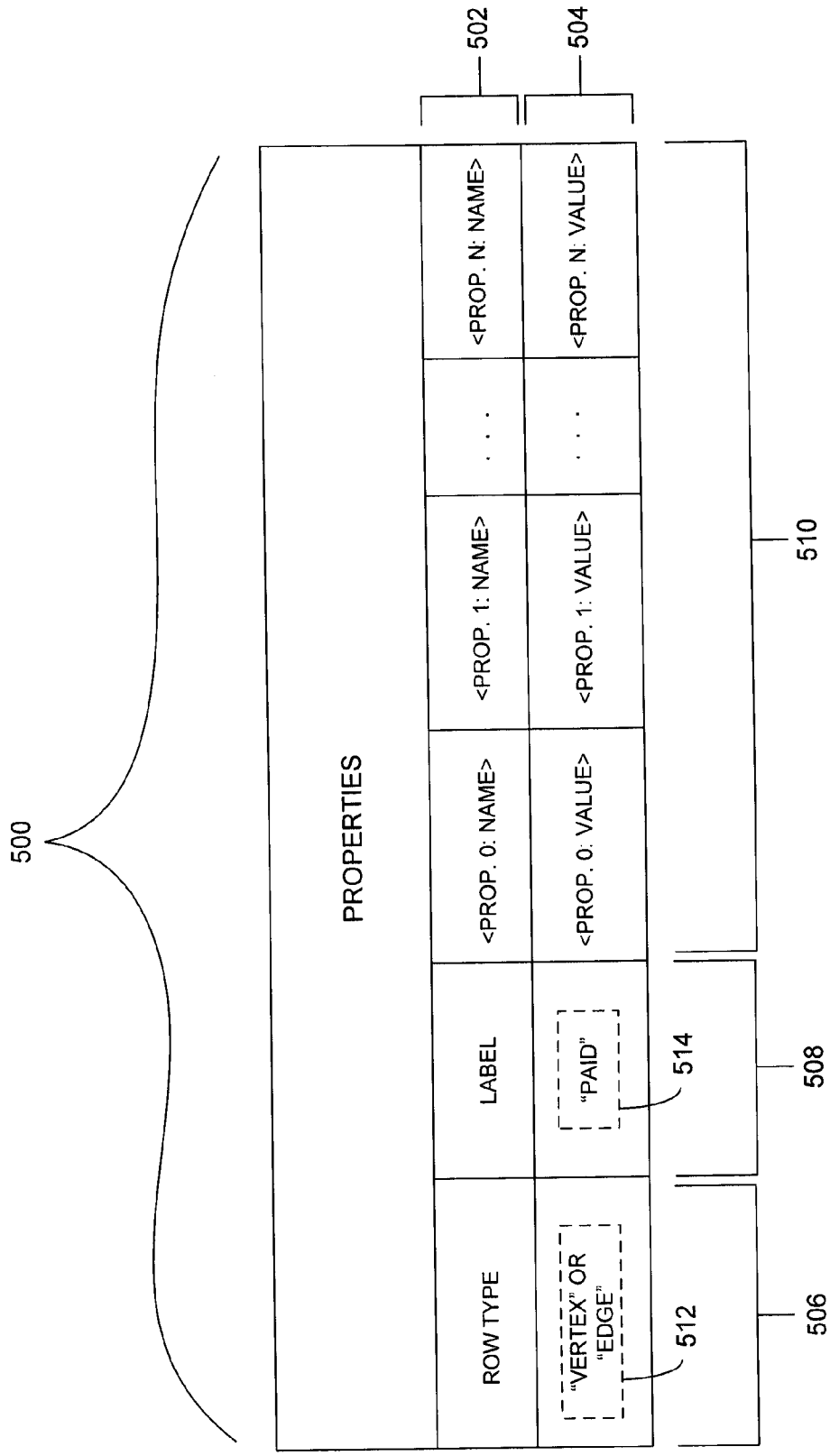
FIG. 5 is a diagram illustrating one example of a Properties column family that may be incorporated into a vertex and/or edge row in accordance with the instant disclosure.

The column assignment engine 112 is also configured to assign a Properties vertex column family (e.g., Properties vertex column family 302) within each vertex row (e.g., vertex row 300). The Properties vertex column family includes one or more properties columns. An example of a generic Properties column family 500 that may be assigned to either a vertex row (as shown by Properties vertex column family 302) or an edge row (as shown by Properties edge column family 402; discussed in further detail below) is shown in FIG. 5. As illustrated in FIG. 5, each Properties column family (i.e., either a Properties vertex column family or a Properties edge column family) includes one or more properties columns, such as properties columns 506, 508, and 510. Further, each properties column includes one or more sub-rows, such as sub-rows 502 and 504. Each sub-row may be configured to store different types of data.

For example, as shown in FIG. 5, the properties column Row Type 506 is configured to store row type data, such as row type data 512. Row type data (e.g., row type data 512) indicates whether a particular row within the column-oriented data store 114 is a vertex row (assigned to one vertex of the one or more vertices in the graph) or an edge row (assigned to one edge of the one or more edges in the graph). The properties column Label 508 is configured to store label data 514 identifying a label associated with a given edge or vertex. For example, with reference back to FIG. 6, a properties column Label 508 corresponding to edge 9 could be populated with the label data 514 "PAID." Additional properties column(s) 510 may likewise store name/value pairs for any other properties associated with the vertices and edges in the graph data 104. For example, one additional property column of the additional properties column(s) 510 might store a property name such as "Age" within the first sub-row (e.g., sub-row 502) of the properties column and store a value such as "32" within the second sub-row (e.g., sub-row 504) of the properties column. In this manner, additional details about the vertex/edge in question can be indexed, retrieved, written, etc. The column-oriented data store population engine may then populate these sub-rows with data (e.g., row type data 512).

Figure 4:
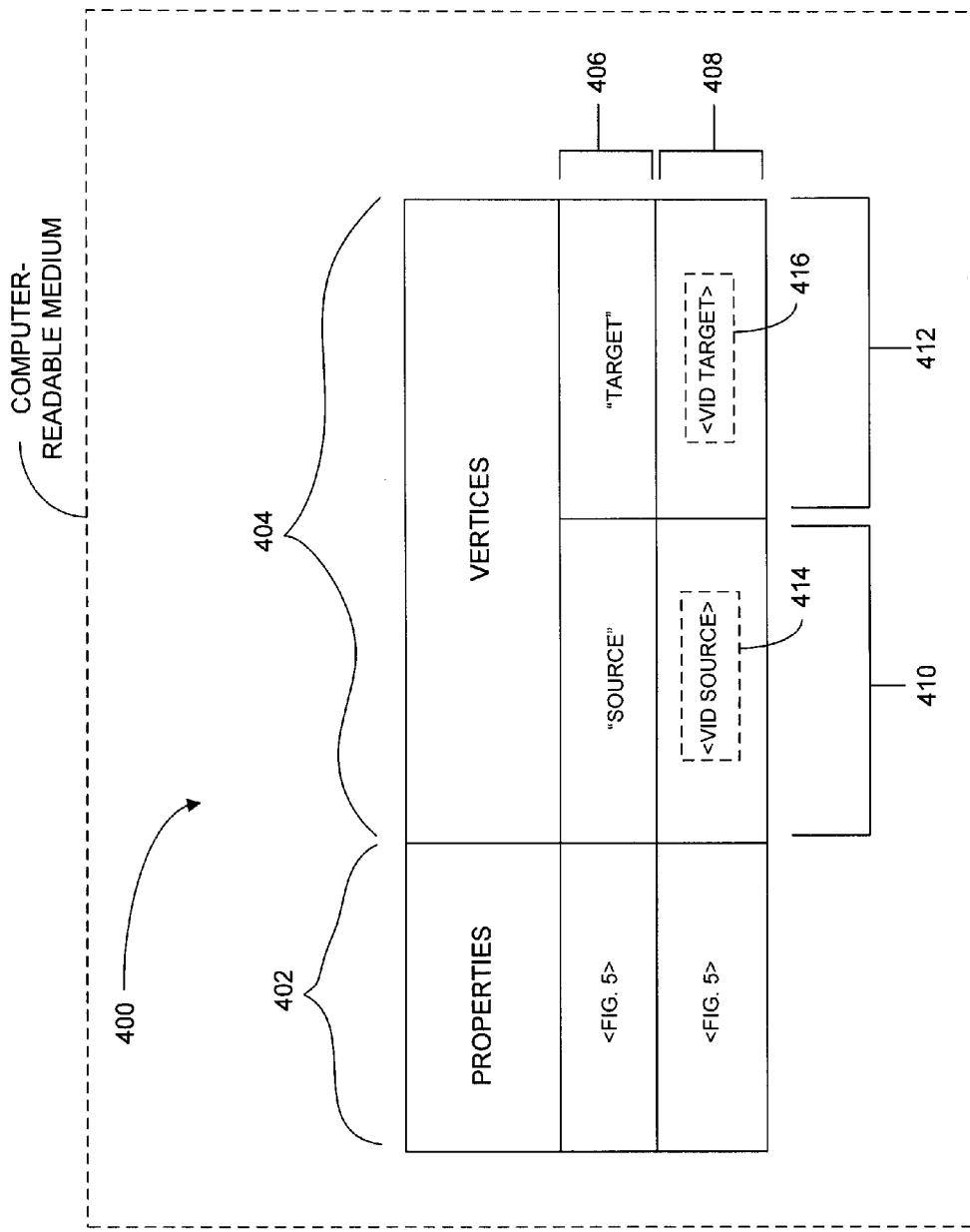
FIG. 4 is a diagram illustrating one example of an edge row populated with data in accordance with the instant disclosure.

The column assignment engine 112 is also configured to assign at least a Vertices edge column family within each edge row, such as the Vertices edge column family 404 shown in FIG. 4. Each Vertices column family includes one or more edge columns, such as edge columns 410 and 412. Each edge column (e.g., edge columns 410 and 412) within the Vertices column family includes one or more sub-rows, such as sub-rows 406 and 408. Each sub-row (e.g., sub-rows 406 and 408) is configured to store vertex ID source data or vertex ID target data, such as vertex ID source data 414 and vertex ID target data 416. Following the assignment of the Vertices edge column family within each edge row, the column-oriented data store population engine 102 is configured to populate the sub-rows (e.g., sub rows 406, 408) with the vertex ID source data (e.g., vertex ID source data 414) and the vertex ID target data (e.g., vertex ID target data 416). As used herein, vertex ID source data includes data uniquely identifying a source vertex from which an edge emanates, while vertex ID target data includes data uniquely identifying a target vertex where an edge terminates.

In the preceding example, the name of edge column 410 is "SOURCE" and the value of edge column 410 is the vertex ID source data 414. Similarly, in the preceding example, the name of edge column 412 is "TARGET" and the value of edge column 412 is the vertex ID target data 416. However, it is understood that in some embodiments, vertex ID data (e.g., vertex ID data 414, 416) may be used as both (i) the column name of edge columns 410, 412 and (ii) the column value. For example, in an embodiment where the graph data 104 to be stored in the column-oriented data store 114 represents a hypergraph (i.e., a graph wherein edges connect to two or more vertices), it may be desirable to use vertex ID data for both the column name and the column value.

Again, the component responsible for assigning the vertex ID source data and the vertex ID target data is the ID assignment engine 120. Specifically, the ID assignment engine is configured to: (1) assign a different ID to each source vertex of the one or more vertices to provide the vertex ID source data and (2) assign a different ID to each target vertex of the one or more vertices to provide the vertex ID target data. In one example, the ID assignment engine 120 uses the UUID scheme described above to assign vertex ID source data and vertex ID target data to each edge. Although, it is recognized that other suitable unique identifying schemes known in the art may be equally employed within the context of the present disclosure. In this manner, each edge within the graph may be characterized by the vertices it is connected to, including vertices that it emanates from, terminates into, or neither (as in the case of an undirected edge).

The column assignment engine 112 is also configured to assign a Properties edge column family (e.g., Properties edge column family 402) within each edge row (e.g., edge row 400). The Properties edge column family may be configured substantially in accordance with the discussion of the generic Properties column family described above with respect to FIG. 5. Thus, the column-oriented data store population engine 102 is configured to populate the one or more sub-rows (e.g., sub-rows 406, 408) with row type data (e.g., row type data 512).

Figure 2:
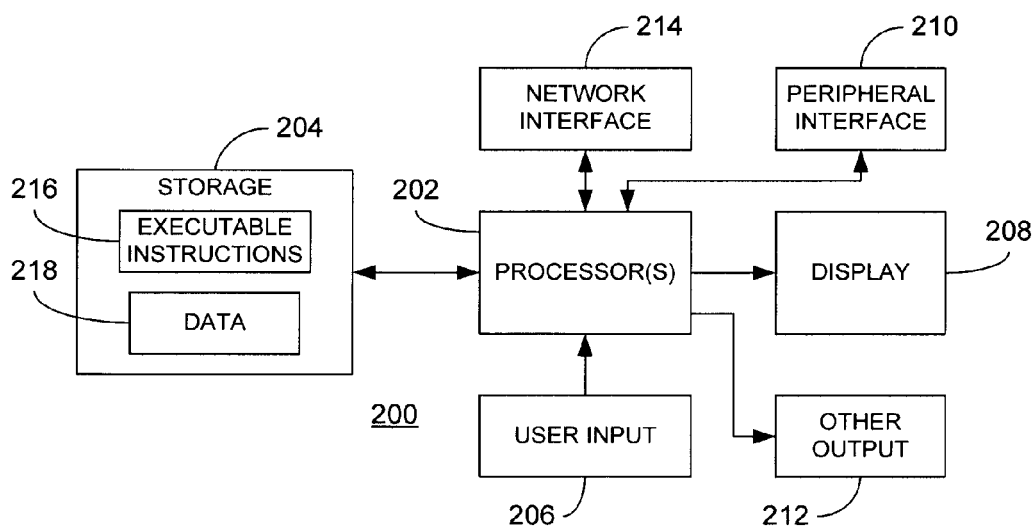
FIG. 2 is a block diagram illustrating one example of one or more processing devices that may be used to implement various embodiments of the instant disclosure.

In an embodiment, the apparatus 100 illustrated in FIG. 1 is implemented using one or more suitably programmed processing devices, such as the processing device 200 illustrated in FIG. 2. The processing device 200 may be used to implement, for example, one or more components of the apparatus 100, as described in greater detail above. Regardless, the processing device 200 includes one or more processors 202 coupled to a storage component 204. The storage component 204, in turn, includes stored executable instructions 216 and data 218. In an embodiment, the processor 202 may include one or more devices such as a microprocessors, microcontrollers, digital signal processors, or combinations thereof capable of executing the stored instructions 216 and operating upon the stored data 218. Likewise, the storage component 204 may include one or more devices such as volatile or nonvolatile memory including, but not limited to, random access memory (RAM) or read only memory (ROM). Further still, the storage component 204 may be embodied in a variety of forms, such as a hard drive, optical disc drive, floppy disc drive, etc. Processor and storage arrangements of the types illustrated in FIG. 2 are well known to those having ordinary skill in the art, for example, in the form of laptop, desktop, tablet, or server computers. In one embodiment, the processing techniques described herein are implemented as a combination of executable instructions and data within the storage component 204.

As shown, the processing device 200 may include one or more user input devices 206, a display 208, a peripheral interface 210, other output devices 212, and a network interface 214 in communication with the processor(s) 202. The user input device 206 may include any mechanism for providing user input to the processor(s) 202. For example, the user input device 206 may include a keyboard, a mouse, a touch screen, microphone, and suitable voice recognition application or any other means, whereby a user of the processing device 200 may provide input data to the processor 202. The display 208 may include any conventional display mechanism such as a cathode ray tube (CRT), flat panel display, or any other display mechanism known to those having ordinary skill in the art. In an embodiment, the display 208, in conjunction with suitable stored instructions 216, may be used to implement a graphical user interface. Implementation of a graphical user interface in this manner is well known to those having ordinary skill in the art. The peripheral interface 210 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 212 may optionally include similar media drive mechanisms, other processing devices, or other output destinations capable of providing information to a user of the processing device 200, such as speakers, LEDs, tactile outputs, etc. Finally, the network interface 214 may include hardware, firmware, and/or software that allows the processor 202 to communicate with other devices via wired or wireless networks, whether local or wide area, private or public, as known in the art. For example, such networks may include the World Wide Web or Internet, or private enterprise networks, as known in the art.

In one example, the column-oriented data store population engine 102, the row assignment engine 110, and the column assignment engine 112 are implemented on one or more appropriate server computers running the Apache™ Cassandra software. That is, in this example, the functionality described herein concerning the column-oriented data store population engine 102, the row assignment engine 110, and the column assignment engine 112 is provided by the native functions of Cassandra. Additionally, the instant disclosure appreciates that apparatus 100 and column-oriented data store 114 could be implemented (e.g., run) on the same server, or decoupled and run separately on different servers without losing any of the functionality described herein.

Figure 7:
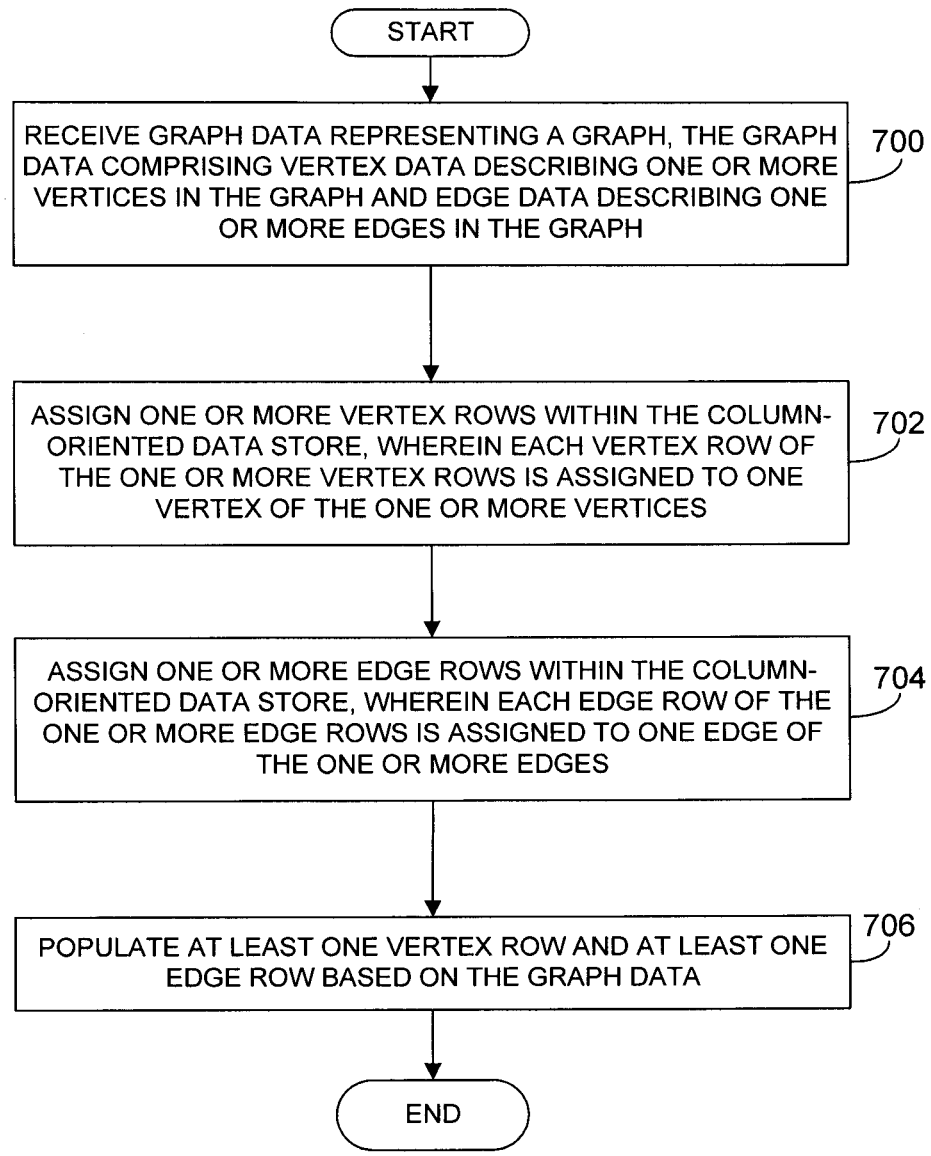
FIG. 7 is a flowchart illustrating a method for storing graph data in accordance with the instant disclosure.

Referring now to FIG. 7, a flow chart illustrating a method for storing graph data in a column oriented data store in accordance with the instant disclosure is provided. While the processing device 200 is a form for implementing the processing described herein (including that illustrated in FIG. 7), those having ordinary skill in the art will appreciate that other, functionally equivalent techniques may be employed. For example, rather than using a single processing device 200, the functionality described herein may be separated over multiple processing devices. Furthermore, as known in the art, some or all of the functionalities implemented via executable instructions may also be implemented using firmware and/or hardware devices such as application specific integrated circuits (ASICs), programmable logic arrays, state machines, etc. Further still, other implementations of the processing device 200 may include a greater or lesser number of components than those illustrated. Once again, those of ordinary skill in the art will appreciate the wide number of variations that may be used is this manner.

Beginning at block 700, graph data representing a graph is received. The graph data may be received by, for example, the column-oriented data store population engine 102. The graph data includes vertex data describing one or more vertices in the graph and edge data describing one or more edges in the graph. At block 702, one or more vertex rows within the column-oriented data store are assigned. This assignment may be accomplished by, for example, the row assignment engine 110. Specifically, each vertex row of the one or more vertex rows is assigned to one vertex of the one or more vertices. At block 704, one or more edge rows within the column-oriented data store are assigned. This assignment may also be accomplished by, for example, the row assignment engine 110. In particular, each edge row of the one or more edge rows is assigned to one edge of the one or more edges. Finally, at block 706, at least one vertex row and at least one edge row are populated based on the graph data. This population may be accomplished by, for example, the column-oriented data store population engine 112.

The present disclosure provides techniques and apparatuses for storing graph data in a column-oriented data store. In particular, the present disclosure provides techniques for storing graph data within another NoSQL class of database management systems.

While example embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:
1. A method comprising:
receiving, by one or more devices, graph data representing a graph,
the graph data comprising vertex data describing one or more vertices in the graph and edge data describing one or more edges in the graph;
assigning, by the one or more devices, one or more vertex rows within a column-oriented data store,
each vertex row, of the one or more vertex rows, being assigned to one vertex of the one or more vertices;
assigning, by the one or more devices, one or more edge rows within the column-oriented data store,
each edge row, of the one or more edge rows, being is assigned to one edge of the one or more edges;
assigning, by the one or more devices, a properties vertex column family within each vertex row,
the properties vertex column family comprising at least one properties column, each at least one properties column comprising at least one sub-row,
each at least one sub-row being to store at least row type data;
populating, by the one or more devices, the at least one sub-row of the at least one properties column with the row type data; and
populating, by the one or more devices, at least one vertex row and at least one edge row based on the graph data.

2. The method of claim 1, further comprising:
assigning at least three different vertex column families within each vertex row,
each vertex column family, of the at least three different vertex column families, comprising at least one vertex column,
each at least one vertex column comprising at least one particular sub-row,
each at least one particular sub-row being to store at least one of vertex ID data or edge ID data; and
populating the at least one particular sub-row with at least one of the vertex ID data or the edge ID data.

3. The method of claim 2, further comprising:
assigning, by the one or more devices, a different ID to each vertex of the one or more vertices to provide the vertex ID data; and
assigning, by the one or more devices, a different ID to each edge of the one or more edges to provide the edge ID data.

4. The method of claim 2, where the at least three different vertex column families comprise:
incoming edges,
outgoing edges, and
undirected edges.

5. The method of claim 4, where
each of the incoming edges, the outgoing edges, and the undirected edges include at least two sub-rows within at least one of the three different vertex column families,
a first sub-row, of the at least two sub-rows, is to store the vertex ID data, and
a second sub-row, of the at least two sub-rows, is to store the edge ID data, and
the method further comprises:
populating the first sub-row with the vertex ID data and the second sub-row with the edge ID data.

6. The method of claim 1, further comprising:
assigning at least a vertices edge column family within each edge row,
the vertices edge column family comprising at least one edge column,
each at least one edge column comprising at least one particular sub-row,
each at least one particular sub-row being to store at least one of vertex ID source data or vertex ID target data; and populating the at least one particular sub-row with at least one of the vertex ID source data or the vertex ID target data.

7. The method of claim 6, further comprising:
assigning a different ID to each source vertex of the one or more vertices to provide the vertex ID source data; and
assigning a different ID to each target vertex of the one or more vertices to provide the vertex ID target data.

8. The method of claim 1, further comprising:
assigning a properties edge column family within each edge row,
  the properties edge column family comprising at least one properties column,
    each at least one properties column comprising at least one particular sub-row,
      each at least one particular sub-row being to store at least row type data; and
populating the at least one particular sub-row of the at least one properties column with the row type data.

9. The method of claim 1, further comprising:
providing, for presentation, the populated at least one vertex row and the populated at least one edge row.

10. An apparatus comprising:
a memory to store instructions; and
a processor to execute the instructions to:
  receive graph data representing a graph,
    the graph data comprising vertex data describing one or more vertices in the graph and edge data describing one or more edges in the graph;
  assign one or more vertex rows within a column oriented data store,
    each vertex row, of the one or more vertex rows, being associated with one vertex of the one or more vertices;
  assign one or more edge rows within the column-oriented data store,
    each edge row, of the one or more edge rows, being associated with one edge of the one or more edges;
  assign a properties edge column family within each edge row,
    the properties edge column family comprising at least one properties column,
      each at least one properties column comprising at least one sub-row,
        each at least one sub-row being to store at least row type data;
  populate the at least one sub-row of the at least one properties column with the row type data; and
  populate at least one vertex row and at least one edge row based on the graph data.

11. The apparatus of claim 10, where the processor is further to:
assign at least three different vertex column families within each vertex row,
  each vertex column family, of the at least three different vertex column families, comprising at least one vertex column,
    each at least one vertex column comprising at least one particular sub-row,
      each at least one particular sub-row being to store at least one of vertex ID data or edge ID data; and
populate the at least one particular sub-row with at least one of the vertex ID data or the edge ID data.

12. The apparatus of claim 11, where the processor is further to:
assign a different ID to each vertex of the one or more vertices to provide the vertex ID data; and
assign a different ID to each edge of the one or more edges to provide the edge ID data.

13. The apparatus of claim 11, where the at least three different vertex column families comprise:
incoming edges,
outgoing edges, and
undirected edges.

14. The apparatus of claim 13, where
each of the incoming edges, the outgoing edges, and the undirected edges include at least two sub-rows within at least one of the three different vertex column families,
a first sub-row, of the at least two sub-rows, is to store the vertex ID data, and
a second sub-row, of the at least two sub-rows, is to store the edge ID data; and
the processor is further to:
  populate the first sub-row with the vertex ID data and the second sub-row with the edge ID data.

15. The apparatus of claim 10, where processor is further to:
assign a properties vertex column family within each vertex row,
  the properties vertex column family comprising at least one properties column,
    each at least one properties column comprising at least one particular sub-row,
      each at least one particular sub-row being to store at least row type data; and
populate the at least one particular sub-row of the at least one properties column with the row type data.

16. The apparatus of claim 10, where the processor is further to:
assign at least a vertices edge column family within each edge row,
  the vertices edge column family comprising at least one edge column,
    each at least one edge column comprising at least one particular sub-row,
      each at least one particular sub-row being to store at least one of vertex ID source data or vertex ID target data; and
populate the at least one particular sub-row with at least one of the vertex ID source data or the vertex ID target data.

17. The apparatus of claim 10, where the processor is further to:
assign a different ID to each source vertex of the one or more vertices to provide the vertex ID source data; and
assign a different ID to each target vertex of the one or more vertices to provide the vertex ID target data.

18. The apparatus of claim 10, where the processor is further to:
provide, for presentation, the populated at least one vertex row and the populated at least one edge row.

19. A system comprising:
one or more devices to:
  receive graph data representing a graph,
    the graph data comprising vertex data describing one or more vertices in the graph and edge data describing one or more edges in the graph;
  assign one or more vertex rows within a column-oriented data store,
    each vertex row, of the one or more vertex rows, being assigned to one vertex of the one or more vertices;
  assign one or more edge rows within the column-oriented data store, each edge row, of the one or more edge rows, being assigned to one edge of the one or more edges;
assign at least a vertices edge column family within each edge row,
the vertices edge column family comprising at least one edge column, each at least one edge column comprising at least one sub-row,
each at least one sub-row being to store at least one of vertex ID source data or vertex ID target data;
populate the at least one sub-row with at least one of the vertex ID source data or the vertex ID target data; and
populate at least one vertex row and at least one edge row based on the graph data.

20. The system of claim 19, where the one or more devices are further to:
assign at least three different vertex column families within each vertex row,
each vertex column family, of the at least three different vertex column families, comprising at least one vertex column,
each at least one vertex column comprising at least one particular sub-row,
each at least one particular sub-row being to store at least one of vertex ID data or edge ID data; and
populate the at least one particular sub-row with at least one of the vertex ID data or the edge ID data.

21. The system of claim 20, where the one or more devices are further to:
assign a different ID to each vertex of the one or more vertices to provide the vertex ID data; and
assign a different ID to each edge of the one or more edges to provide the edge ID data.

22. The system of claim 20, where the at least three different vertex column families comprise:
incoming edges,
outgoing edges, and
undirected edges.

23. The system of claim 22, where
each of the incoming edges, the outgoing edges, and the undirected edges include at least two sub-rows within at least one of the three different vertex column families,
a first sub-row, of the at least two sub-rows, is to store the vertex ID data, and
a second sub-row, of the at least two sub-rows, is to store the edge ID data, and
the one or more devices are further to:
populate the first sub-row with the vertex ID data and the second sub-row with the edge ID data.

24. The system of claim 19, where the one or more devices are further to:
assign a properties vertex column family within each vertex row,
the properties vertex column family comprising at least one properties column,
each at least one properties column comprising at least one particular sub-row,
each at least one particular sub-row being to store at least row type data; and
populate the at least one particular sub-row of the at least one properties column with the row type data.

25. The system of claim 19, where the one or more devices are further to:
assign a properties edge column family within each edge row,
the properties edge column family comprising at least one properties column,
each at least one properties column comprising at least one particular sub-row,
each at least one particular sub-row being to store at least row type data; and
populate the at least one particular sub-row of the at least one properties column with the row type data.

26. The system of claim 19, where the one or more devices are further to:
assign a different ID to each source vertex of the one or more vertices to provide the vertex ID source data; and
assign a different ID to each target vertex of the one or more vertices to provide the vertex ID target data.

27. The system of claim 19, where the one or more devices are further to:
provide, for presentation, the populated at least one vertex row and the populated at least one edge row.

28. A non-transitory computer-readable medium storing instructions, the instructions comprising:
one or more instructions which, when executed by a processor of a device, cause the processor to:
receive graph data representing a graph,
the graph data comprising vertex data describing one or more vertices in the graph and edge data describing one or more edges in the graph;
assign one or more vertex rows within a column-oriented data store,
each vertex row, of the one or more vertex rows, being assigned to one vertex of the one or more vertices;
assign one or more edge rows within the column-oriented data store,
each edge row, of the one or more edge rows, being assigned to one edge of the one or more edges;
assign at least a vertices edge column family within each edge row,
the vertices edge column family comprising at least one edge column, each at least one edge column comprising at least one sub-row,
each at least one sub-row being to store at least one of vertex ID source data or vertex ID target data; and
populate the at least one sub-row with at least one of the vertex ID source data or the vertex ID target data; and
populate at least one vertex row and at least one edge row based on the graph data.

29. The non-transitory computer-readable medium of claim 28, where the instructions further include:
one or more instructions to assign at least three different vertex column families within each vertex row,
each vertex column family, of the at least three different vertex column families, comprising at least one vertex column,
each at least one vertex column comprising at least one particular sub-row,
each at least one particular sub-row being to store at least one of vertex ID data or edge ID data; and
one or more instructions to populate the at least one particular sub-row with at least one of the vertex ID data or the edge ID data.

30. The non-transitory computer-readable medium of claim 29, where the instructions further include:
one or more instructions to assign a different ID to each vertex of the one or more vertices to provide the vertex ID data; and
one or more instructions to assign a different ID to each edge of the one or more edges to provide the edge ID data.

31. The non-transitory computer-readable medium of claim 29, where the at least three different vertex column families comprise:
  incoming edges,
  outgoing edges, and
  undirected edges.

32. The non-transitory computer-readable medium of claim 31, where
  each of the incoming edges, the outgoing edges, and the undirected edges include at least two sub-rows within at least one of the three different vertex column families,
    a first sub-row, of the at least two sub-rows, is to store the vertex ID data, and
    a second sub-row, of the at least two sub-rows, is to store the edge ID data, and
  the instructions further include:
    one or more instructions to populate the first sub-row with the vertex ID data and the second sub-row with the edge ID data.

33. The non-transitory computer-readable medium of claim 28, where the instructions further include:
  one or more instructions to assign a properties vertex column family within each vertex row,
    the properties vertex column family comprising at least one properties column,
      each at least one properties column comprising at least one particular sub-row,
        each at least one particular sub-row is being to store at least row type data; and
    one or more instructions to populate the at least one particular sub-row of the at least one properties column with the row type data.

34. The non-transitory computer-readable medium of claim 28, where the instructions further include:
  one or more instructions to assign a Properties edge column family within each edge row,
    the Properties edge column family comprising at least one properties column,
      each at least one properties column comprising at least one particular sub-row,
        each at least one particular sub-row being to store at least row type data; and
    one or more instructions to populate the at least one particular sub-row of the at least one properties column with the row type data.

35. The non-transitory computer-readable medium of claim 28, where the instructions further include:
  one or more instructions to assign a different ID to each source vertex of the one or more vertices to provide the vertex ID source data; and
  one or more instructions to assign a different ID to each target vertex of the one or more vertices to provide the vertex ID target data.

36. The non-transitory computer-readable medium of claim 28, where the instructions further include:
  one or more instructions to provide, for presentation, the populated at least one vertex row and the populated at least one edge row.

* * * * *